United States Patent
Mao et al.

(10) Patent No.: US 10,434,461 B2
(45) Date of Patent: Oct. 8, 2019

(54) CARBON DIOXIDE ABSORBENT AND METHOD FOR ABSORBING AND DESORBING CARBON DIOXIDE

(71) Applicants: China Petroleum & Chemical Corporation, Chaoyang District, Beijing (CN); Research Institute of Nanjing Chemical Ind. Group, Luhe District, Nanjing, Jiangsu Province (CN)

(72) Inventors: Songbai Mao, Nanjing (CN); Zhongbin Huang, Nanjing (CN)

(73) Assignees: CHINA PETROLEUM & CHEMICAL CORPORATION, Beijing (CN); RESEARCH INSTITUTE OF NANJING CHEMICAL INDUSTRY GROUP, Nanjing (CN)

( * ) Notice: Subject to any disclaimer, the term of this patent is extended or adjusted under 35 U.S.C. 154(b) by 253 days.

(21) Appl. No.: 14/881,796

(22) Filed: Oct. 13, 2015

(65) Prior Publication Data

US 2016/0101385 A1    Apr. 14, 2016

(30) Foreign Application Priority Data

Oct. 14, 2014    (CN) .......................... 2014 1 0540195

(51) Int. Cl.
    *B01D 53/14*    (2006.01)
(52) U.S. Cl.
    CPC ..... *B01D 53/1493* (2013.01); *B01D 53/1475* (2013.01); *B01D 2252/2041* (2013.01); *B01D 2252/20421* (2013.01); *B01D 2252/20426* (2013.01); *B01D 2252/20431* (2013.01); *B01D 2252/20447* (2013.01); *B01D 2252/20452* (2013.01); *B01D 2252/20484* (2013.01); *B01D 2252/20494* (2013.01); *B01D 2252/504* (2013.01); *Y02A 50/2342* (2018.01); *Y02C 10/06* (2013.01)

(58) Field of Classification Search
    None
    See application file for complete search history.

(56) References Cited

FOREIGN PATENT DOCUMENTS

CA          2651888 A1  *  11/2007   .........  B01D 53/1475

\* cited by examiner

*Primary Examiner* — Anita Nassiri-Motlagh
(74) *Attorney, Agent, or Firm* — Buchanan Ingersoll & Rooney PC

(57) ABSTRACT

A carbon dioxide absorbent is disclosed. The absorbent comprises organic amine, amino acid, and water, wherein said organic amine comprises tertiary amine and primary amine and/or secondary amine; and wherein amino acid is excess based on a stoichiometrical ratio of organic amine to amino acid in a reaction. A method for absorbing and desorbing carbon dioxide is further disclosed. In the absorbent system provided by the present disclosure, the conversion between primary (secondary) amine and (secondary) tertiary amine can be realized under the catalytic effect of amino acid with the changing of temperature, and carbon dioxide can be absorbed and desorbed effectively under a relatively low temperature.

18 Claims, No Drawings

CARBON DIOXIDE ABSORBENT AND METHOD FOR ABSORBING AND DESORBING CARBON DIOXIDE

CROSS REFERENCE TO RELATED APPLICATION

The present application claims benefit of Chinese patent application CN 201410540195.9, entitled "Thermo-sensitive Amido Carbon Dioxide Absorbent" and filed on Oct. 14, 2014, which is incorporated herein by reference.

FIELD OF THE INVENTION

The present disclosure relates to the technical field of gas separation or purification, and particularly to a carbon dioxide absorbent and a method for absorbing and desorbing carbon dioxide.

BACKGROUND OF THE INVENTION

During recent years, the large amount of carbon dioxide emission brought about by fossil fuel burning has led to greenhouse effect and other environmental problems, and all countries in the world have to take carbon dioxide emission reduction measures considering the environment and climate changes resulted from the greenhouse effect. At present, the chemical absorption method is mainly used for collecting carbon dioxide in industrial application, and the main research direction of chemical absorption method is seeking a stable, high effective and low energy consumption absorbent. However, monoethanolamine (MEA), hot potash, amino acid salt and other absorbents in the prior art all have the disadvantages of high energy consumption.

Chinese patent application CN101190397B discloses a carbon dioxide absorbent comprising mixed solution of inorganic salt of amino acid and amine, and the absorbent has a high absorption rate and a large absorption capacity. However, since the compound generated after carbon dioxide is absorbed is relatively stable, the technical problem that the desorption ratio of carbon dioxide is low and a high temperature is needed is not solved essentially.

Chinese patent application CN102658019 discloses a composite activated potash solution used for removing carbon dioxide from flue gas. The composite activated potash solution is composed of alkaline amino acid salt and inorganic acid salt, and the alkaline amino acid salt accounts for 0.5 wt % to 10 wt %. In the aforesaid invention, amino acid salt only serves as activating agent.

In SIEMENS' patent CN102245278, the carbon dioxide absorbent comprises mixture of free amino acid and amino acid salt. The excess amino acid plays the role of regulating the pH value of the absorbent. The absorbent in the aforesaid invention does not comprise organic amine component.

Based on the status quo that large amount of carbon dioxide is emitted, a carbon dioxide absorbent with improved performance is urgently needed.

SUMMARY OF THE INVENTION

The present disclosure aims to provide a carbon dioxide absorbent, so as to obtain a thermo-sensitive absorbent system through the interaction between amino acid and organic amine, whereby carbon dioxide can be desorbed effectively under a relatively low temperature.

The present disclosure provides a carbon dioxide absorbent, comprising organic amine, amino acid, and water, wherein said organic amine comprises tertiary amine and primary amine and/or secondary amine; and wherein amino acid is excess based on a stoichiometrical ratio of organic amine to amino acid in a reaction.

The expression of "amino acid is excess based on a stoichiometrical ratio of organic amine to amino acid in a reaction" in the last paragraph can be understood as follows. Under a condition when the absorbent is used, if an amount of amino acid which can react completely with all the organic amine contained therein is a (it can be easily understood by those skilled in the art), "amino acid is excess" mentioned in the present disclosure means that the amount of amino acid in the absorbent is larger than a. Specifically, in the carbon dioxide absorbent system provided by the present disclosure, amino acid is excess based on a stoichiometrical ratio of amido in organic amine to carboxyl in amino acid in a reaction.

According to the present disclosure, the organic amine can be a combination selected from a group consisting of: primary amine and tertiary amine; secondary amine and tertiary amine; and primary amine, secondary amine, and tertiary amine.

According to a preferred embodiment of the present disclosure, the organic amine is mixed amine of primary amine and tertiary amine.

Without limited by theory, the present disclosure is based on the following invention ideas. The absorbent system according to the present disclosure comprises organic amine, excess amino acid, and deionized water, wherein the organic amine is mixed amine of tertiary amine and primary amine and/or secondary amine, and protons are transferred in a system coexisting with amino acid through temperature regulation, so that a conversion between primary (secondary) amine and (secondary) tertiary amine is realized. Under a relatively low temperature, in the absorbent system, tertiary (secondary) amine converts into (secondary) primary amine (mainly tertiary amine converts into secondary amine and primary amine, and secondary amine converts into primary amine), so that the absorbent can absorb carbon dioxide with a much higher absorption rate. Under a relatively high temperature, the system mainly exists in the form of tertiary (secondary) amine, while the binding force between tertiary (secondary) amine and carbon dioxide is far weaker than that between corresponding (secondary) primary amine and carbon dioxide. In this case, the bond energy between the organic amine and carbon dioxide is reduced to a large extent, and thus carbon dioxide can be desorbed from the system easily. The amino acid added therein can play roles in the following three aspects. First, amino acid and organic amine can form amino acid salt. Second, amino acid can regulate the pH value of the system and play a buffering effect on the pH value of the system. Third, amino acid can play a role of catalyst and promote the conversion between primary (secondary) amine and (secondary) tertiary amine. In the absorbent system according to the present disclosure, the conversion between tertiary (secondary) amine and (secondary) primary amine can be realized sensitively through temperature regulation, so that the absorption and desorption of carbon dioxide can also be realized sensitively through temperature regulation. Therefore, the present disclosure provides a thermo-sensitive carbon dioxide absorbent.

According to the present disclosure, the absorbent is obtained after the reaction of a certain amount of amino acid and organic amine. The compounds used therein are substances exist in the prior art, but the system obtained after reaction and the technical feature that the conversion between primary (secondary) amine and (secondary) tertiary amine can be realized under the catalytic effect of amino acid to facilitate the absorption and desorption of carbon dioxide as well as the related technical solution are not reported in other patents.

According to the present disclosure, said primary amine is preferably one or more selected from a group consisting of monoethanolamine, methyl monoethanolamine, 2-amino-2-methyl-1-propanol, β-hydroxyethylenediamine, and 3-(methylamino)propylamine, and more preferably at least one selected from a group consisting of 2-amino-2-methyl-1-propanol, monoethanolamine, and 3-(methylamino)propylamine.

According to the present disclosure, said secondary amine is preferably one or more selected from a group consisting of diethanolamine, tertiarybutylamineethoxyethanol (TBEE), piperazine and derivatives thereof, and morpholine and derivatives thereof, and more preferably tertiarybutylamineethoxyethanol (TBEE).

According to the present disclosure, a preferred molecular structural formula of said tertiary amine is:

wherein a number of C atom of $R_1$, $R_2$, or $R_3$ ranges from 0 to 3; and wherein $R_1$, $R_2$, and $R_3$ each is alkyl, hydroxyalkyl, or hydroxyl, and at least one of $R_1$, $R_2$, and $R_3$ is hydroxyalkyl, or hydroxyl (the number of C atom is 0).

Further, said tertiary amine is preferably at least one selected from a group consisting of N-methyldiethanolamine, triethanolamine, and 2-(diisopropylamino)ethanol.

According to the present disclosure, said amino acid is preferably one or more selected from a group consisting of the amino acid with the following molecular structural formula:

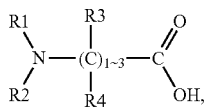

wherein a number of C atom of R1, R2, R3, or R4 ranges from 0 to 3, and R1, R2, R3, and R4 each is selected from a group consisting of hydrogen (the number of C atom is 0), alkyl, and hydroxyalkyl.

Further, said amino acid is preferably at least one selected from a group consisting of alanine, aminoacetic acid, and serine.

According to a preferred embodiment of the present disclosure, based on a total weight of the absorbent, said absorbent comprises 10 wt % to 45 wt %, preferably 11 wt % to 34 wt % amino acid, and 5 wt % to 35 wt %, preferably 6 wt % to 19 wt % organic amine.

According to a preferred embodiment of the present disclosure, based on a total weight of the absorbent, said absorbent is composed of 10 wt % to 45 wt %, preferably 11 wt % to 34 wt % amino acid, 5 wt % to 35 wt %, preferably 6 wt % to 19 wt % organic amine, and water as a balance.

According to a preferred embodiment of the present disclosure, in said absorbent, a molar ratio of organic amine to amino acid is 1:(1-3), preferably 1:(1.1-2.4), and more preferably 1:(1.1-1.8).

According to a preferred embodiment of the present disclosure, in said absorbent, a molar ratio of a total amount of primary amine and secondary amine to amino acid is 1:(1.5-5), preferably 1:(1.8-3.2), and more preferably 1:(2-2.5).

In the carbon dioxide absorbent according to the present disclosure, amino acid is excess based on a stoichiometrical ratio of organic amine to amino acid in a reaction. According to the present disclosure, as aforementioned, the amino acid added therein can play roles in the following three aspects. First, amino acid and organic amine can form amino acid salt. In this case, the vapor pressure of the absorbent can be reduced to a large extent, and a better absorption performance of the absorbent can be maintained. Second, amino acid can regulate the pH value of the system and play a buffering effect on the pH value of the system so as to facilitate the absorption and desorption of carbon dioxide. Third, amino acid can play a role of catalyst and promote the conversion between primary (secondary) amine and (secondary) tertiary amine Therefore, carbon dioxide can be desorbed by the absorbent system under a lower temperature, and the desorbing ability of the absorbent can be improved. In particular, the role amino acid plays in the third aspect is different from that of the carbon dioxide absorbent disclosed in the prior art.

According to a preferred specific embodiment, the present disclosure provides a carbon dioxide absorbent, consisting of organic amine, amino acid, and water, wherein said organic amine is mixed amine of tertiary amine and primary amine and/or secondary amine, and a molar ratio of a total amount of primary amine and secondary amine to amino acid is 1:(1.8-3.2); and wherein said primary amine is at least one selected from a group consisting of 2-amino-2-methyl-1-propanol, monoethanolamine, and 3-(methylamino)propylamine, said secondary amine is tertiarybutylamineethoxyethanol (TBEE), said tertiary amine is at least one selected from a group consisting of N-methyldiethanolamine, triethanolamine, and 2-(diisopropylamino)ethanol, and said amino acid is preferably at least one selected from a group consisting of alanine, aminoacetic acid, and serine.

According to another aspect of the present disclosure, a method for absorbing and desorbing carbon dioxide is further provided. The method comprises the following steps:

a) dissolving organic amine and amino acid into water to obtain absorbent, wherein said organic amine comprises tertiary amine and primary amine and/or secondary amine; and wherein amino acid is excess based on a stoichiometrical ratio of organic amine to amino acid in a reaction;

b) heating the absorbent and keeping the absorbent under an absorption temperature, and adding gas sample containing carbon dioxide to a bottom of the absorbent, so that carbon dioxide is absorbed by the absorbent; and c) heating the solution with carbon dioxide absorbed therein under stirring and keeping the solution under a desorption temperature, so that the carbon dioxide absorbed therein is desorbed and the absorbent is regenerated.

In the method for absorbing and desorbing carbon dioxide provided by the present disclosure, the primary amine, secondary amine, tertiary amine, and amino acid can be selected from the primary amine, secondary amine, tertiary amine, and amino acid as mentioned hereinabove.

In the method provided by the present disclosure, a molar ratio of organic amine to amino acid is 1:(1-3), preferably 1:(1.1-2.4), and more preferably 1:(1.1-1.8).

In the method provided by the present disclosure, a molar ratio of a total amount of primary amine and secondary amine to amino acid is 1:(1.5-5), preferably 1: (1.8-3.2), and more preferably 1:(2-2.5).

According to a preferred embodiment of the present disclosure, the absorption temperature ranges from 25° C. to 60° C., and preferably ranges from 36° C. to 50° C.

According to a preferred embodiment of the present disclosure, the desorption temperature ranges from 81° C. to 119° C., and preferably ranges from 91° C. to 104° C.

According to the methods for absorbing and desorbing carbon dioxide provided by the present disclosure, carbon dioxide can be absorbed fast under a relatively low temperature. Then, when the temperature converts into the aforesaid desorption temperature, a conversion between primary (secondary) amine and (secondary) tertiary amine in the absorption system is realized with the transfer of protons, so that the carbon dioxide absorbed therein can be desorbed in an effective manner. It can be seen from the above temperature range that, in the carbon dioxide absorbent system provided by the present disclosure, carbon dioxide does not need to be desorbed under a high temperature. Moreover, the temperature conversion range from the absorption temperature to the desorption temperature is not large, and carbon dioxide can be desorbed with large amount. Thus, the present disclosure provides a thermosensitive carbon dioxide absorbent, whereby carbon dioxide can be absorbed and desorbed conveniently and effectively.

Preferably, in step b), a flow-rate of the gas sample containing carbon dioxide, calculated in terms of carbon dioxide, ranges from 60 ml/min to 120 ml/min, preferably ranges from 70 ml/min to 110 ml/min, and more preferably ranges from 70 ml/min to 100 ml/min. In the carbon dioxide absorbent system provided by the present disclosure, the flow-rate of the gas sample selected from the above range enables the carbon dioxide to be absorbed more efficiently.

Preferably, step b) is performed with stirring.

According to a preferred embodiment of the present disclosure, in step b) and step c), the stirring speed preferably ranges from 100 rpm to 200 rpm, more preferably ranges from 120 rpm to 170 rpm, for example 150 rpm.

The water referred to in the present disclosure is preferably deionized water, or can be ultra-pure water.

In step b), the gas sample containing carbon dioxide can be coal-burning flue gas, natural gas, synthetic gas, etc. Therefore, the present disclosure further provides use of the carbon dioxide absorbent or the method for absorbing and desorbing carbon dioxide provided herein for collecting carbon dioxide from coal-burning flue gas, natural gas, synthetic gas, etc.

The following beneficial effects can be brought about by the present disclosure. The absorbent system is simple in composition, the raw materials thereof are cheap and easy to get, and thus the cost thereof is low. No inorganic substance (such as metal hydroxide or metal salt) is necessary, and thus the system as well as the recycling and treatment procedures of the absorbent can be simplified. Carbon dioxide does not need to be desorbed under a high temperature, and the power consumption thereof can be reduced. The absorbent has a high absorption speed and a large absorption capacity. Moreover, the operation loss and the degradation ratio of the raw materials are extremely low, and the desorption ratio of carbon dioxide is high.

DETAILED DESCRIPTION OF THE EMBODIMENTS

The present disclosure will be illustrated hereinafter in combination with specific examples. However, it can be understood that, the scope of the present disclosure is not limited by the examples disclosed herein.

Example 1

Alanine (0.25 mol), N-methyldiethanolamine (0.1 mol), and 2-amino-2-methyl-1-propanol (0.12 mol) are dissolved in deionized water (150 ml), and the absorbent mixed solution can be obtained. The above mixed solution is put into a four-necked flask with a mixer (150 rpm) and a thermometer, and the temperature of the solution in the flask is maintained at 40° C. under oil-bath heating. Carbon dioxide with a concentration of 99.9% is added to a bottom of the solution at a flow-rate of 70 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 100° C. under stirring with a speed of 150 rpm. The solution is measured continuously with a wet corrosion-proof flow meter, and thus a desorption ratio of carbon dioxide can be calculated. The experimental results are shown in Table 1 and Table 2, wherein Table 1 shows the amount of carbon dioxide absorbed in each liter of absorbent solution with the increasing of absorption time, and Table 2 shows the amount of residual carbon dioxide in each liter of absorbent solution with the increasing of desorption time.

Example 2

Aminoacetic acid (0.25 mol), N-methyldiethanolamine (0.14 mol), and monoethanolamine (0.08 mol) are dissolved in deionized water (150 ml), and the absorbent mixed solution can be obtained. The above mixed solution is put into a four-necked flask with a mixer (150 rpm) and a thermometer, and the temperature of the solution in the flask is maintained at 40° C. under oil-bath heating. Carbon dioxide with a concentration of 99.9% is added to a bottom of the solution at a flow-rate of 70 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 100° C. under stirring with a speed of 150 rpm. The solution is measured continuously with a wet corrosion-proof flow meter, and thus a desorption ratio of carbon dioxide can be calculated. The experimental results are shown in Table 1 and Table 2.

Example 3

Serine (0.25 mol), N-methyldiethanolamine (0.12 mol), and monoethanolamine (0.1 mol) are dissolved in deionized water (150 ml), and the absorbent mixed solution can be obtained. The above mixed solution is put into a four-necked flask with a mixer (150 rpm) and a thermometer, and the temperature of the solution in the flask is maintained at 40° C. under oil-bath heating. Carbon dioxide with a concentration of 99.9% is added to a bottom of the solution at a flow-rate of 70 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 100° C. under stirring with a speed of 150 rpm. The solution is measured continuously with a wet corrosion-proof flow meter, and thus a desorption ratio of carbon dioxide can be calculated. The experimental results are shown in Table 1 and Table 2.

Example 4

Aminoacetic acid (0.25 mol), N-methyldiethanolamine (0.1 mol), and 3-(methylamino)propylamine (0.06 mol) are dissolved in deionized water (150 ml), and the absorbent mixed solution can be obtained. The above mixed solution is put into a four-necked flask with a mixer (150 rpm) and a thermometer, and the temperature of the solution in the flask is maintained at 40° C. under oil-bath heating. Carbon dioxide with a concentration of 99.9% is added to a bottom of the solution at a flow-rate of 70 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 100° C. under stirring with a speed of 150 rpm. The solution is measured continuously with a wet corrosion-proof flow meter, and thus a desorption ratio of carbon dioxide can be calculated. The experimental results are shown in Table 1 and Table 2.

Example 5

Serine (0.25 mol), N-methyldiethanolamine (0.12 mol), and tertiarybutylamineethoxyethanol (TBEE) (0.08 mol) are dissolved in deionized water (150 ml), and the absorbent mixed solution can be obtained. The above mixed solution is put into a four-necked flask with a mixer (150 rpm) and a thermometer, and the temperature of the solution in the flask is maintained at 40° C. under oil-bath heating. Carbon dioxide with a concentration of 99.9% is added to a bottom of the solution at a flow-rate of 70 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 100° C. under stirring with a speed of 150 rpm. The solution is measured continuously with a wet corrosion-proof flow meter, and thus a desorption ratio of carbon dioxide can be calculated. The experimental results are shown in Table 1 and Table 2.

Example 6

Serine (0.27 mol), 2-(diisopropylamino)ethanol (0.1 mol), and 3-(methylamino)propylamine (0.06 mol) are dissolved in deionized water (150 ml), and the absorbent mixed solution can be obtained. The above mixed solution is put into a four-necked flask with a mixer (150 rpm) and a thermometer, and the temperature of the solution in the flask is maintained at 32° C. under oil-bath heating. Carbon dioxide with a concentration of 99.9% is added to a bottom of the solution at a flow-rate of 90 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 98° C. under stirring with a speed of 150 rpm. The solution is measured continuously with a wet corrosion-proof flow meter, and thus a desorption ratio of carbon dioxide can be calculated. The experimental results are shown in Table 1 and Table 2.

Example 7

Aminoacetic acid (0.28 mol), N-methyldiethanolamine (0.1 mol), monoethanolamine (0.07 mol), and piperazine (0.05 mol) are dissolved in deionized water (150 ml), and the absorbent mixed solution can be obtained. The above mixed solution is put into a four-necked flask with a mixer (160 rpm) and a thermometer, and the temperature of the solution in the flask is maintained at 50° C. under oil-bath heating. Carbon dioxide with a concentration of 99.9% is added to a bottom of the solution at a flow-rate of 80 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 104° C. under stirring with a speed of 150 rpm. The solution is measured continuously with a wet corrosion-proof flow meter, and thus a desorption ratio of carbon dioxide can be calculated. The experimental results are shown in Table 1 and Table 2.

Example 8

The operation steps of the present example are basically the same as those of example 1, and the difference thereof only lies in that, in the present example, carbon dioxide with a concentration of 99.9% is substituted with coal-burning flue gas sample with a volume concentration of carbon dioxide of about 10%, and the sample is added to a bottom of the solution at a flow-rate of 700 ml/min. The experimental results are shown in Table 1 and Table 2.

Reference Example 1

Monoethanolamine (MEA) solution (150 ml, 1.47 mol/L) is put into a four-necked flask with a mixer (150 rpm) and a thermometer, and the temperature of the solution in the flask is maintained at 40° C. under oil-bath heating. Carbon dioxide with a concentration of 99.9% is added to a bottom of the solution at a flow-rate of 70 ml/min. The solution is measured continuously with a wet corrosion-proof flow meter, and thus an absorption volume of carbon dioxide can be calculated. After the absorption experiment is completed, the desorption experiment is performed. That is, the above solution with carbon dioxide absorbed therein is heated and maintained at 100° C. under stirring with a speed of 150 rpm. The solution is measured continuously with a wet corrosion-proof flow meter, and thus a desorption ratio of carbon dioxide can be calculated. The experimental results are shown in Table 1 and Table 2.

Reference Example 2

In the present example, except that the amount of alanine is changed into 0.1 mol, other experimental conditions and operation steps are the same as those of example 1. The experimental results are shown in Table 1 and Table 2.

Reference Example 3

In the present example, except that the amount of serine is changed into 0.1 mol, other experimental conditions and operation steps are the same as those of example 6. The experimental results are shown in Table 1 and Table 2.

TABLE 1

$CO_2$ absorption situations

| | Absorption time Time | | | |
|---|---|---|---|---|
| | 20 min | 40 min | 1 h | 5 h |
| | Solution | | | |
| | $CO_2$ L/L solution | $CO_2$ L/L solution | $CO_2$ L/L solution | $CO_2$ L/L solution |
| Example 1 | 1.81 | 3.59 | 5.01 | 19.56 |
| Example 2 | 2.08 | 3.89 | 5.08 | 19.98 |
| Example 3 | 2.10 | 4.04 | 5.38 | 19.09 |
| Example 4 | 2.11 | 4.10 | 5.53 | 20.43 |
| Example 5 | 2.29 | 4.34 | 5.23 | 20.11 |
| Example 6 | 1.94 | 3.68 | 5.44 | 19.78 |
| Example 7 | 2.40 | 4.65 | 5.66 | 21.04 |
| Example 8 | 1.66 | 3.49 | 4.99 | 19.06 |
| Reference example 1 | 1.89 | 3.77 | 5.16 | 17.44 |
| Reference example 2 | 1.86 | 3.47 | 5.10 | 19.77 |
| Reference example 3 | 2.01 | 3.89 | 5.74 | 19.97 |

TABLE 2

$CO_2$ desorption situations

| | Desorption time Time | | | | | |
|---|---|---|---|---|---|---|
| | Before desorption | 5 min | 10 min | 20 min | 40 min | 1 h |
| | Solution | | | | | |
| | $CO_2$ L/L solution | $CO_2$ L/L solution | $CO_2$ L/L solution | $CO_2$ L/L solution | $CO_2$ L/L solution | $CO_2$ L/L solution |
| Example 1 | 19.56 | 14.77 | 10.1 | 7.57 | 5.44 | 3.97 |
| Example 2 | 19.98 | 15.02 | 11.23 | 8.27 | 6.45 | 4.57 |
| Example 3 | 19.09 | 15.23 | 11.15 | 8.57 | 6.30 | 4.27 |
| Example 4 | 20.43 | 15.48 | 11.43 | 8.87 | 6.75 | 4.45 |
| Example 5 | 20.11 | 14.99 | 10.34 | 7.98 | 5.67 | 4.05 |
| Example 6 | 19.78 | 16.58 | 12.43 | 9.43 | 7.78 | 6.03 |
| Example 7 | 21.04 | 12.32 | 7.43 | 5.12 | 4.1 | 3.23 |
| Example 8 | 19.06 | 14.22 | 10.00 | 7.43 | 5.21 | 3.37 |
| Reference example 1 | 17.44 | 14.05 | 10.81 | 8.98 | 7.98 | 7.53 |
| Reference example 2 | 19.77 | 17.77 | 15.10 | 13.57 | 11.94 | 10.77 |
| Reference example 3 | 19.97 | 17.13 | 14.43 | 11.48 | 10.08 | 9.83 |

It can be seen from the above examples and reference examples as well as the experimental results as shown in Tables 1 and 2 that, the absorption ability of the carbon dioxide absorbent provided by the present disclosure is better than MEA. In particular, the absorption capacity can be improved by 13% at least. In addition, under the same conditions, the desorption ability thereof far exceeds MEA, and the desorption ratio can be improved by about 47% (as shown in example 1). As shown by the experimental results of reference examples 2 and 3, when the amount of amino acid is not excess, the desorption ability of the absorbent is apparently poor. The absorbent provided by the present disclosure shows good absorption and desorption performance when used for absorbing and desorbing carbon dioxide in the coal-burning flue gas (as shown in example 8).

The present disclosure is illustrated in detail hereinabove. However, it is obvious for those skilled in the art to make amendments within the spirit and scope of the present disclosure. In addition, it can be understood that, different aspects recited in the present disclosure, different parts of the specific examples, and different technical features disclosed herein can be combined or interchanged totally or partly. In the above specific examples, the examples which refer to another example can be combined with other examples in a reasonable manner, which can be understood by those skilled in the art. Moreover, it can be understood by those skilled in the art that, the above description only shows specific examples, but not used for limiting the present disclosure.

The invention claimed is:

1. A carbon dioxide absorbent for absorption of $CO_2$ at a temperature range from 36° C. to 50° C., and desorption of $CO_2$ at a temperature range from 91° C. to 104° C. comprising organic amine, amino acid, and water, wherein said organic amine comprises tertiary amine and at least one of primary amine and secondary amine;

wherein the amino acid is excess based on a stoichiometrical ratio of the organic amine to the amino acid in a reaction; and wherein in said absorbent, a molar ratio of a total amount of the primary amine and the secondary amine to the amino acid is 1:(1.8-4.2).

2. The absorbent according to claim 1, wherein said primary amine is one or more selected from the group consisting of monoethanolamine, methyl monoethanolamine, 2-amino-2-methyl-1-propanol, β-hydroxyethylenediamine, and 3-(methylamino)propylamine; and/or wherein said secondary amine is one or more selected from the group consisting of diethanolamine, tertiary-butylamineethoxyethanol (TBEE), piperazine and derivatives thereof, and morpholine and derivatives thereof.

3. The absorbent according to claim 1, wherein a molecular structural formula of said tertiary amine is:

wherein a number of C atom of $R_1$, $R_2$, or $R_3$ ranges from 0 to 3; and wherein $R_1$, $R_2$, and $R_3$ each is alkyl, hydroxyalkyl, or hydroxyl, and at least one of $R_1$, $R_2$, and $R_3$ is hydroxyalkyl, or hydroxyl.

4. The absorbent according to claim 1, wherein said amino acid is one or more selected from the group consisting of the amino acid with the following molecular structural formula:

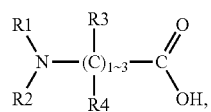

wherein a number of C atom of R1, R2, R3, or R4 ranges from 0 to 3, and R1, R2, R3, and R4 each is selected from the group consisting of hydrogen, alkyl, and hydroxyalkyl.

5. The absorbent according to claim 1, wherein based on a total weight of the absorbent, said absorbent comprises 10 wt % to 45 wt % amino acid, 5 wt % to 35 wt % the organic amine, and water as a balance.

6. The absorbent according to claim 1, wherein a molar ratio of the organic amine to the amino acid is 1:(1.1-3).

7. The absorbent according to claim 6, wherein the molar ratio of the organic amine to the amino acid is 1:(1.1-2.4).

8. The absorbent according to claim 7, wherein the molar ratio of the organic amine to the amino acid is 1:(1.1-1.8).

9. The absorbent according to claim 1, wherein in said absorbent, a molar ratio of a total amount of the primary amine and the secondary amine to the amino acid is 1:(1.8-3.2).

10. The absorbent according to claim 9, wherein in said absorbent, a molar ratio of a total amount of the primary amine and the secondary amine to the amino acid is 1:(2-2.5).

11. The absorbent according to claim 1, wherein the organic amine is mixed amine of the primary amine and the tertiary amine.

12. A carbon dioxide absorbent for absorption of $CO_2$ at a temperature range from 36° C. to 50° C., and desorption of $CO_2$ at a temperature range from 91° C. to 104° C., comprising organic amine, amino acid, and water,
wherein said organic amine is mixed amine of tertiary amine and at least one of primary amine and secondary amine, and a molar ratio of a total amount of the primary amine and the secondary amine to the amino acid is 1:(1.8-3.2); and
wherein said primary amine is at least one selected from the group consisting of 2-amino-2-methyl-1-propanol, monoethanolamine, and 3-(methylamino)propylamine, said secondary amine is tertiarybutylamineethoxyethanol (TBEE), said tertiary amine is at least one selected from the group consisting of N-methyldiethanolamine, triethanolamine, and 2-(diisopropylamino)ethanol, and said amino acid is at least one selected from the group consisting of alanine, aminoacetic acid, and serine.

13. A method for absorbing and desorbing carbon dioxide, comprising the following steps:
a) dissolving organic amine and amino acid into water to obtain absorbent, wherein the amino acid is excess based on a stoichiometrical ratio of the organic amine to the amino acid in a reaction, wherein said organic amine comprises tertiary amine and at least one of primary amine and secondary amine; and wherein in said absorbent, a molar ratio of a total amount of the primary amine and the secondary amine to the amino acid is 1:(1.8-4.2);
b) heating the absorbent and keeping the absorbent under an absorption temperature at a temperature range from 36° C. to 50° C., and adding gas sample containing carbon dioxide to a bottom of the absorbent, so that carbon dioxide is absorbed by the absorbent; and
c) heating the solution with carbon dioxide absorbed therein under stirring and keeping the solution under a desorption temperature at a temperature range from 91° C. to 104° C., so that the carbon dioxide absorbed therein is desorbed and the absorbent is regenerated.

14. The method according to claim 13, wherein said primary amine is one or more selected from the group consisting of monoethanolamine, methyl monoethanolamine, 2-amino-2-methyl-1-propanol, β-hydroxyethylenediamine, and 3-(methylamino)propylamine; and/or
wherein said secondary amine is one or more selected from the group consisting of diethanolamine, tertiarybutylamineethoxyethanol (TBEE), piperazine, and morpholine; and/or
wherein, a molecular structural formula of said tertiary amine is:

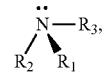

wherein a number of C atom of $R_1$, $R_2$, or $R_3$ ranges from 0 to 3, $R_1$, $R_2$, and $R_3$ each is alkyl, hydroxyalkyl, or hydroxyl, and at least one of $R_1$, $R_2$, and $R_3$ is hydroxyalkyl, or hydroxyl; and
wherein said amino acid is one or more selected from the group consisting of the amino acid with the following molecular structural formula:

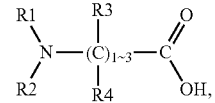

wherein a number of C atom of R1, R2, R3, or R4 ranges from 0 to 3, and R1, R2, R3, and R4 each is selected from the group consisting of hydrogen, alkyl, and hydroxyalkyl.

15. The method according to claim 13, wherein a molar ratio of the organic amine to the amino acid is 1:(1.1-3).

16. The method according to claim 13, wherein in said absorbent, a molar ratio of a total amount of the primary amine and the secondary amine to the amino acid is 1:(1.8-3.2).

17. The method according to claim 13, wherein in step b), a flow-rate of the gas sample containing carbon dioxide, calculated in terms of carbon dioxide, ranges from 60 ml/min to 120 ml/min.

18. The method according to claim 13, wherein a flow-rate of the gas sample containing carbon dioxide, calculated in terms of carbon dioxide, ranges from 70 ml/min to 100 ml/min.

* * * * *